United States Patent [19]

Horiuchi et al.

[11] Patent Number: 4,571,063
[45] Date of Patent: Feb. 18, 1986

[54] RECORDING APPARATUS

[75] Inventors: Tatsumi Horiuchi, Hino; Takashi Tamura, Higashimine; Tatufumi Kusuda, Hachioji; all of Japan

[73] Assignee: Konishiroku Photo Industry Co., Ltd., Tokyo, Japan

[21] Appl. No.: 525,602

[22] Filed: Aug. 22, 1983

[30] Foreign Application Priority Data

Aug. 24, 1982 [JP] Japan ............................. 57-146606

[51] Int. Cl.⁴ ............................................. G03G 15/04
[52] U.S. Cl. ....................................... 355/8; 355/3 R; 355/75
[58] Field of Search ................. 355/3 R, 8, 75

[56] References Cited

U.S. PATENT DOCUMENTS

| | | | |
|---|---|---|---|
| 3,554,640 | 1/1971 | Hoskins | 355/8 |
| 3,586,450 | 6/1971 | Hosey et al. | 355/8 |
| 3,604,796 | 9/1971 | Ogawa | 355/8 X |

Primary Examiner—Fred L. Brauni
Attorney, Agent, or Firm—Frishauf, Holtz, Goodman & Woodward

[57] ABSTRACT

A recording apparatus has a movable member for exposing an original to light and for scanning the original; and a power transmission device for reciprocally moving the movable member. The power transmission device has a plunger type solenoid, a first clutch coupled to the plunger of the solenoid for controlling forward movement of the movable member in response to an operation of the plunger type solenoid to a first state, and a second clutch coupled to the plunger for controlling backward movement of the movable member in response to the plunger type solenoid being in a second state. The plunger of the solenoid is movable relative to the solenoid coil between first and second positions, the first position being an attracted position in which the solenoid coil is energized and the plunger is attracted thereto, and the second position being beyond a limit position of attraction whereat the plunger is not attracted to the solenoid coil upon energization of the solenoid coil. The plunger assumes its first position when the solenoid is in one of its first and second states, the plunger assumes its second position when the solenoid is in the other of its first and second states. The power transmission device also has movable cam coupled to the second clutch for moving the plunger from the second position thereof to a third position intermediate the first and second positions and in an area where the plunger can be attracted by energization of the solenoid coil.

10 Claims, 6 Drawing Figures

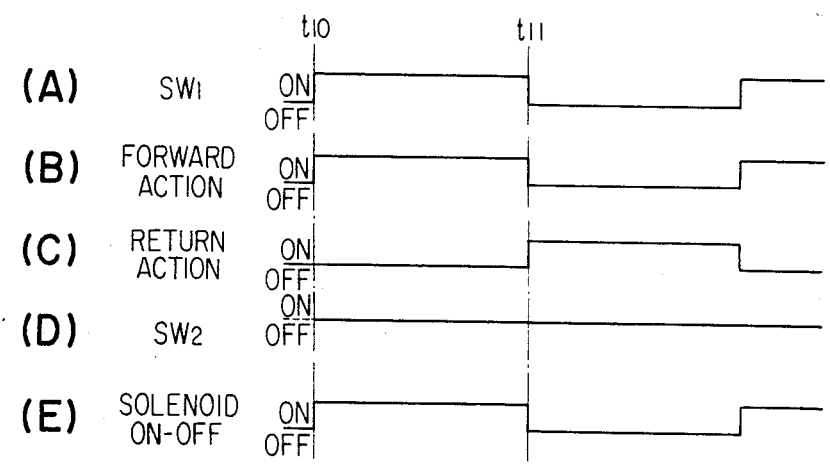
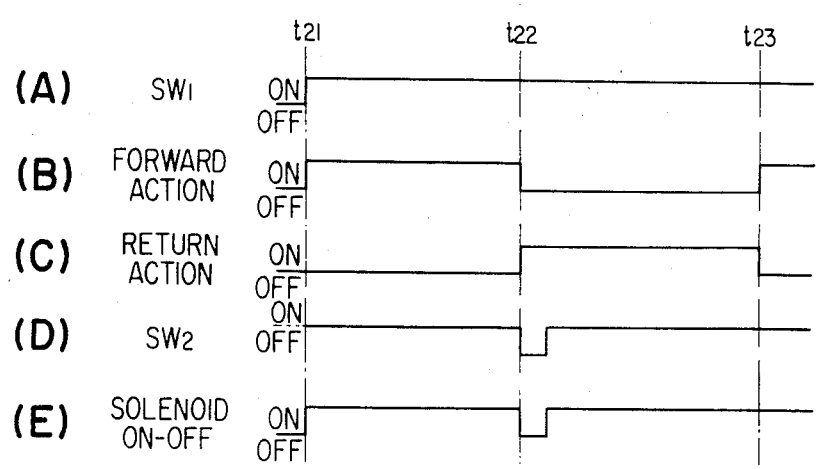

RECORDING APPARATUS

BACKGROUND OF THE INVENTION

1. Field of the Invention

The invention relates to a recording apparatus in which a movable member for scanning an original during exposure is reciprocated by a power transmission gear mechanism having a plunger type electric solenoid.

2. Description of the Prior Art

Referring particularly to a recording apparatus such as an electrophotographic copying apparatus, some are provided with a power transmission gear mechanism using a plunger type solenoid to reciprocate their optical system and original table in a specific direction.

In a copying apparatus of conventional structure, when trouble occurs in the controller thereof, the original table (table holding material to be copied) reciprocally oscillates at a limit point of its forward movement. This problem occurs not only in a machine having a movable original table, but also in a machine having a movable or reciprocable optical system. When such a problem occurs, the power transmission of the system is apt to be damaged. Moreover, such an oscillation difficulty may possibly damage the movable original table or the movable optical system.

SUMMARY OF THE INVENTION

The object of the invention is to overcome the disadvantages described above and to provide a recording apparatus in which, when reciprocating a movable member for exposing an original and for scanning the same, such as an original table or an optical system, by means of a power transmission device having a plunger type electric solenoid, then an energization is cut off to the plunger type electric solenoid when the movable member reaches a forward limit point, and when a backward movement of the movable member is started, then the plunger is kept positioned in an area impossible to adsorb the plunger. Thus the abovementioned movable member, i.e., for exposing an original to light and/or for scanning the same, can be prevented from forward or backward oscillating movement thereof at short periodic intervals.

BRIEF DESCRIPTION OF THE DRAWINGS

FIG. 1 shows waveforms illustrating a copying operation in an apparatus of the present invention.

FIG. 5 shows waveforms illustrating a forward movementoperation in the apparatus of the invention, in a state of a controller trouble.

DETAILED DESCRIPTION OF THE INVENTION

The first example of a copying apparatus to which the invention is applied will be described with reference to FIGS. 1–5. In the undermentioned examples, like numerals or like reference designation refer to like parts as those in the aforegiven conventional examples and the descriptions thereof are hereinafter omitted.

Figure 2:
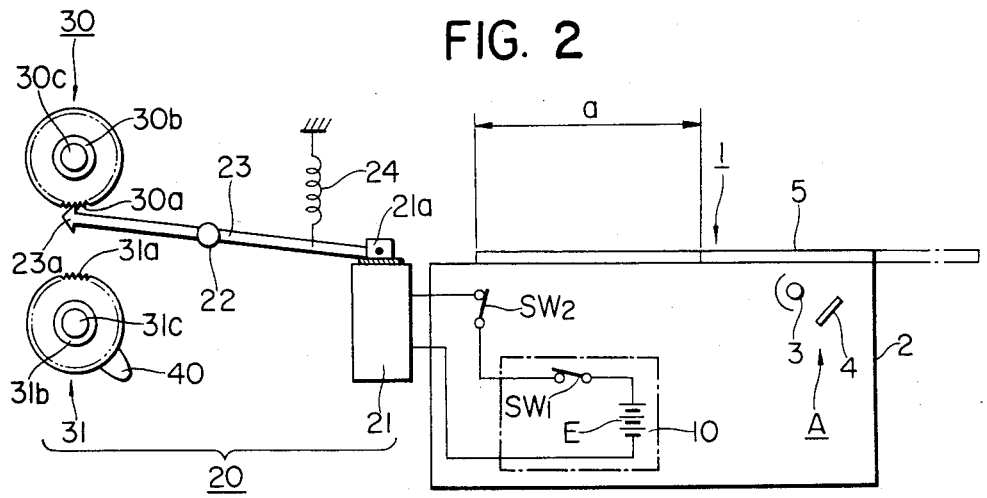
FIG. 2 is an illustration of a substantial part of a copying apparatus of the present invention, wherein a forward moving state is shown.

When switch SW1 is switched over to the ON-state at the point of time $t_{10}$, corresponding to the start of a copying operation as shown by waveforms (A)–(E) in FIG. 1, an electric current is conducted to the solenoid coil as shown by waveform (E) in FIG. 1 because switch SW2 is still in the ON-state; plunger type solenoid 21 changes into an attracted state as shown in FIG. 2; rod-shaped member 23 rotates clockwise about supporting point 22; stopper 23a engages with ratchet 30a of spring clutch 30; power is transmitted from driving shaft 30b to driven shaft 30c; and thus, similar to the conventional examples, original table 5 changes to a forward moving state as shown by waveform (B) in FIG. 1.

Figure 3:
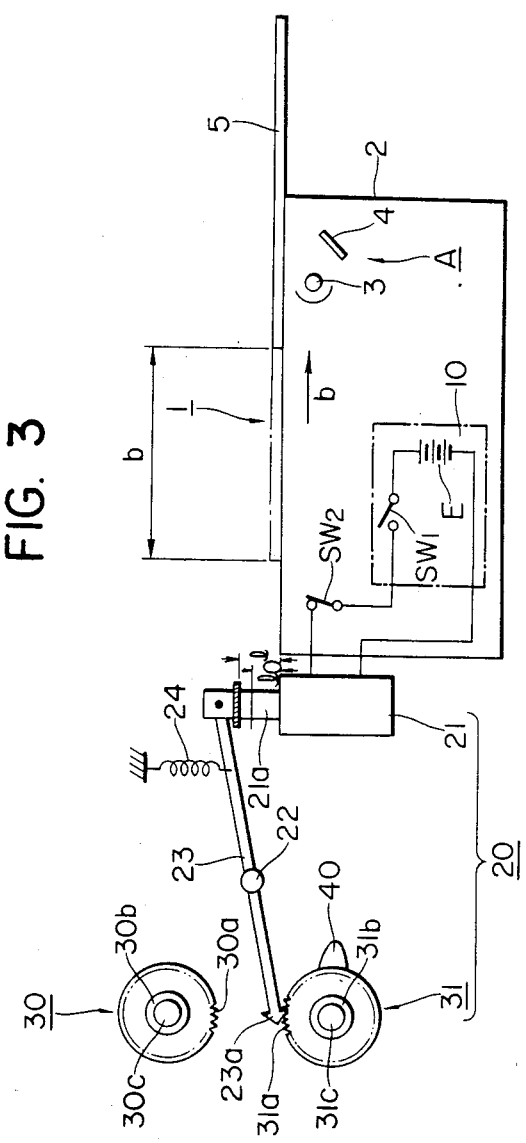
FIG. 3 is an illustration of a substantial part of the copying apparatus of FIG. 2, wherein a backward moving state is shown.

When a copying operation is completed once at the same time of a forward movement of the original table 5, switch SW1 is switched over to the OFF-state (an open circuit state) by generating circuit of controller 10 at a prescribed point (a point of time $t_{11}$ FIG. 1). Electric current to the solenoid coil at this time is cut off, while switch SW2 remains in its ON-state (a closed state). As shown in FIG. 3, rod-shaped member 23 is rotated counterclockwise about supporting point 22 by tension spring 24 and stopper 23a is engaged with ratchet 31a of spring clutch 31. Resultantly, power is transmitted from driving shaft 31b to driven shaft 31c, and thus, similar to the conventional examples, original table 5 is changed to a backward moving state as indicated by the point of time $t_{11}$ shown by waveform (C) in FIG. 1.

Now, referring to plunger type solenoid 21, plunger rod 21a is so arranged as to be pulled up exceedingly in accordance with the rotation of rod-shaped member 23. In other words, when the solenoid is electrically energized, plunger rod 21a is drawn far up beyond the limit point $l_0$ where the plunger rod can be attracted. The effect provided by drawing up plunger rod 21a exceedingly as described above will be described later in the description of controller 10 in trouble.

After passing the point of time $t_{11}$, original table 5 keeps moving backward and when it starts to return to the starting point of forward movements, that is, the original position of the original table 5, switch SW1 is then switched over to the OFF-state.

Figure 4:
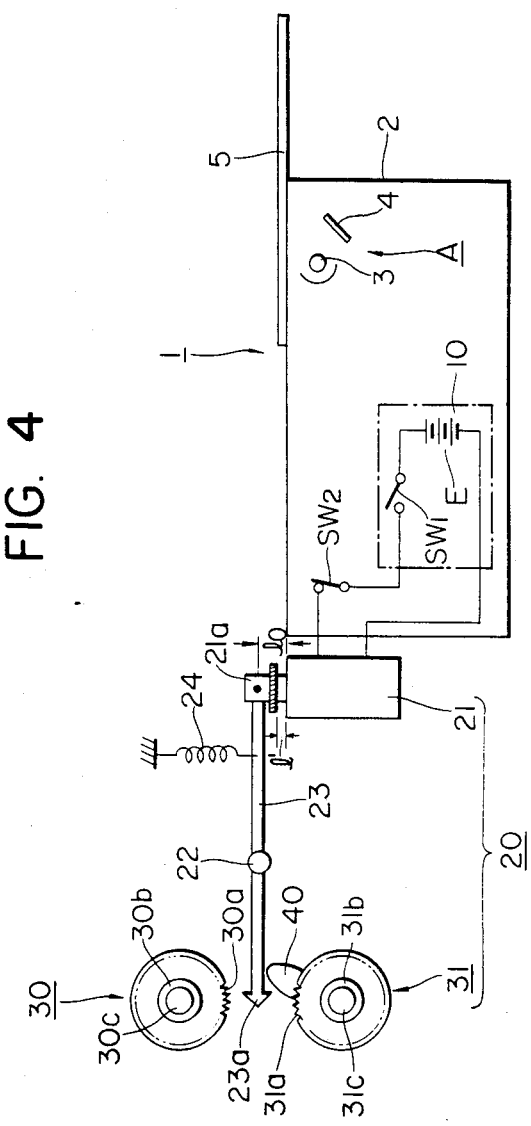
FIG. 4 is an illustration of a substantial part of the copying apparatus of FIG. 2, wherein a state where a backward movement was completed is shown.

Cam 40 rotates counterclockwise during the abovementioned backward movement of original table 5. At the point of time when original table 5 returns to the original position, one end of rod-shaped member 23 is lifted upward by cam 40, as shown in FIG. 4.

Resultantly, rod-shaped member 23 will lie in or about the intermediate position between spring clutches 30, 31, and stopper 23a does not engage with either of ratchets 30a and 31a. In this state, the plunger rod 21a can be attracted if the plunger type solenoid 21 is energized and it is therefore possible to bring the apparatus to that state shown in FIG. 2. That is to say, the copying apparatus is restored to the initial state and thereafter the abovementioned copying operations are repeated by switching the switch SW1 over to the ON-state again.

Normal copying operations are described as above. Now a description will be made about the circuit operations in the case when switch SW1 remains in its ON-state due to, for example, controller trouble.

In this case, switch SW1 continues to be in the ON-state from the point of time $t_{21}$ shown by waveform (A) in FIG. 5, and the solenoid coil remains energized. Therefore, plunger solenoid 21 is attracted to be in a forward moving state as described with reference to FIG. 2. However, should switch SW1 not be in the OFF-state due to control failure, original table 5 reaches the limit point of forward movement to resultantly energize switch SW2 and then to switch it over to its OFF-state (the circuit is opened).

Resultantly, as indicated by the point of time $t_{22}$ shown by waveforms (A)-(E) in FIG. 5, respectively, an electric conduction to the solenoid coil is cut off and original table 5 is switched over to a backward moving state. Accordingly, as shown by the point of time $t_{22}$, switch SW2 is changed again to the ON-state and the solenoid coil 21b is then energized.

What should be carefully noted is the drawing stroke l of plunger rod 21a. As illustrated in FIG. 3, in a backward moving state, the plunger rod 21a is beyond the limit position $l_0$ where the plunger rod 21a can be attracted uppermost. Therefore, even when the solenoid coil is energized again, plunger rod 21a is not so attracted as shown in FIG. 2, but its backward movement position is maintained so that backward movement of original table 5 is maintained. When original table 5 returns to the original position, rod-shaped member 23 is then pushed up by cam 40, as illustrated in FIG. 4.

At this point of time, the drawing stroke l of the plunger is shorter than the stroke for the limit $l_0$. Therefore, plunger solenoid 21 is now in the state where it can be attracted when the coil of solenoid 21 is energized. Switches, SW1, SW2 are also in the ON-state and original table 5 is therefore switched again over to the forward moving state, similar to the point of time $t_{23}$ shown by waveforms (A)-(E) in FIG. 5.

In other words, in a copying apparatus 1 to which the invention is applied, original table 5 never reciprocates in a short periodic cycle, even if switch SW1 is in the ON-state. In addition, the functions of such a copying apparatus are never impaired.

Figure 6:
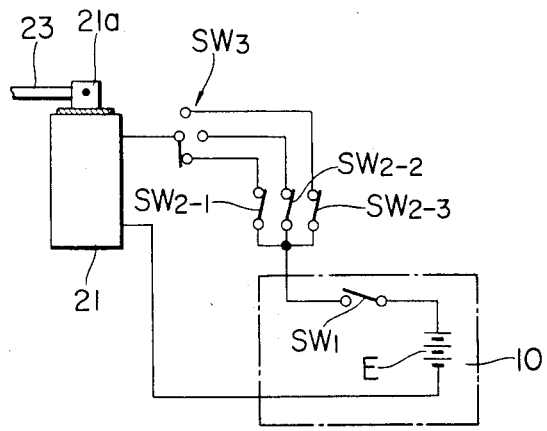
FIG. 6 is a circuit diagram of a substantial part of a copying apparatus in accordance with a second example of the invention.

Next, the second example of the invention will be illustrated with reference to FIG. 6. Switch SW3 shown in FIG. 6 is switchable in accordance with the copy-paper sizes such as A3, A4, B3, and the like (which are not shown in the drawing), and switches SW2-1, SW2-2 and SW2-3 are to be respectively provided at the limit position for the forward movement of original table 5 described in the aforegiven first example, according to copy-paper sizes.

In such a construction as described above, original table 5 is reciprocated in motion by switching switch SW3 in accordance with copy-paper sizes. Further, should switch SW1 be in the ON-state due to trouble or the like of controller 10, the same operations as described with respect to FIG. 5 are performed in every limit position for forward movements according to the copy-paper sizes by means of switch SW3 corresponding to a copy-paper size used. Therefore, in the arrangement of FIG. 6, it is possible not only that short periodic reciprocation of original table 5 is prevented similar to that described in the first example, but also that the program memories in controller 10 are decreased by providing respective switches SW2-1 through SW2-3 so as to correspond to copy-paper sizes. In addition, it becomes unnecessary to read-in encoder signals as much as the memories are decreased.

The abovementioned first and second examples are directed to devices of the original table reciprocation type; however, the invention shall not be limited thereto, but may be applied to a copying apparatus in which the optical system A is reciprocated in motion.

As described above, the invention can be achieved by embodying a recording apparatus of which a movable member for exposing an original to light and for scanning the same is reciprocated in motion by means of a power transmitting device having a plunger solenoid, wherein the abovementioned plunger solenoid is kept in an adsorbable state by applying an electric energization thereto, and the abovementioned movable member is stopped in the original state. When the plunger solenoid is put in an operational state by applying an electric current thereto, the movable member is moved forward by means of the abovementioned power transmitting device so that the movable member can be moved backward by means of the power transmitting device in the position beyond the limit position of attraction generated by energizing the plunger solenoid. According to such a recording apparatus as constituted above, even if the plunger solenoid is energized when the abovementioned movable member is moved backward, the movable member is never switched over from the backward moving state to the forward moving state within a short periodic cycle, and any damage or the like to a movable member can be prevented beforehand.

What is claimed is:

1. In a recording apparatus comprising:
 a movable member for exposing an original to light and for scanning said original; and
 a power transmission device for reciprocally moving said movable member, said power transmission device comprising a plunger type solenoid having a plunger and a coil, a first clutch means coupled to said plunger for controlling forward movement of said movable member in response to an operation of said plunger type solenoid to a first state, and a second clutch means coupled to said plunger for controlling backward movement of said movable member in response to said plunger type solenoid being in a second state;
 the improvement wherein:
 said plunger of said solenoid is movable relative to said solenoid coil between first and second positions, said first position being an attracted position in which said solenoid coil is energized and said plunger is attracted thereto, and said second position being beyond a limit position of attraction whereat said plunger is not attracted to said solenoid coil upon energization of said solenoid coil;
 said plunger assuming said first position when said solenoid is in one of its first and second states, and said plunger assuming said second position when said solenoid is in the other of its first and second states; and
 said power transmission device further comprises:
 a movable cam means coupled to said second clutch means for moving said plunger from said second position thereof to a third position intermediate said first and second positions and in an area where said plunger can be attracted by said plunger type solenoid upon energization of said solenoid coil;
 a recording start switch; and a limit switch arranged for detecting a forward movement limit position of said movable member and for causing said power transmission device to deactivate said second clutch means responsive to said movable member reaching said forward movement limit position.

2. The recording apparatus of claim 1, wherein said plunger assumes said first position thereof when said solenoid is in said first state, and said plunger assumes said second position thereof when said solenoid is in said second state.

3. The recording apparatus of claim 1, wherein said power transmission device further comprises a rod-shaped member coupled to said plunger for selectively engaging and disengaging from said first and second clutch means at one end of said rod-shaped member.

4. The recording apparatus of claim 1, wherein said recording start switch and said limit switch are coupled together in series.

5. The recording apparatus of claim 1, wherein a plurality of said limit switches are provided for detecting a corresponding plurality of forward movement limit positions of said movable member, said limit switches being correspondingly activated in accordance with different size recording papers used in the apparatus.

6. The recording apparatus of claim 1, wherein said power transmission device further comprises a rod-shaped member which is pivotally mounted at a point intermediate the ends thereof, one end of said rod-shaped member being coupled to said plunger and the other end of said rod-shaped member being selectively engaged with and disengaged from said first and second clutch means; and spring means biasing said rod-shaped member about said pivot point in a given direction.

7. The recording apparatus of claim 1, wherein said first clutch means comprises a spring.

8. The recording apparatus of claim 1, wherein said second clutch means comprises a spring.

9. The recording apparatus of claim 1, wherein said movable member for exposing an original to light and for scanning same comprises a reciprocable original table for holding an original to be recorded.

10. The recording apparatus of claim 1, wherein said movable member for exposing an original to light and for scanning same comprises at least a portion of an optical system, said portion of said optical system being reciprocable.

* * * * *